April 18, 1950 L. D. FLETCHER 2,504,405
POWER OPERATED PRUNING SHEARS
Filed May 14, 1947
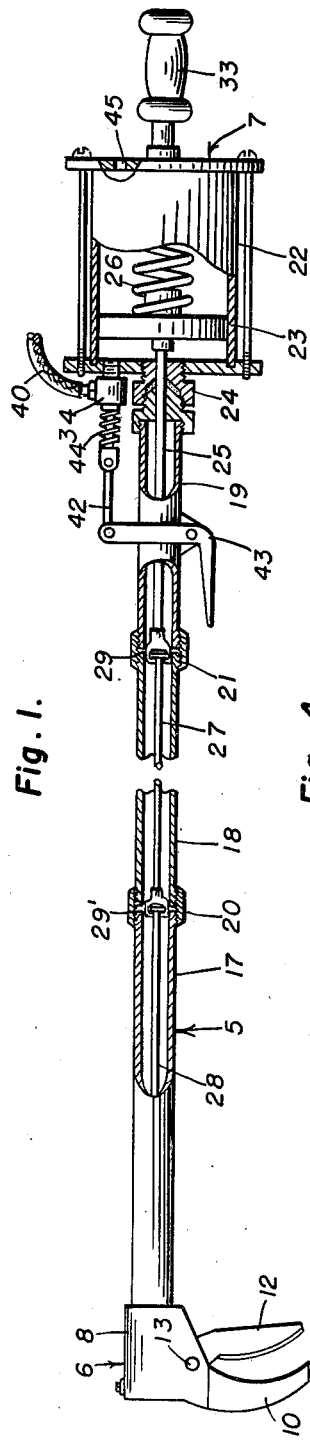
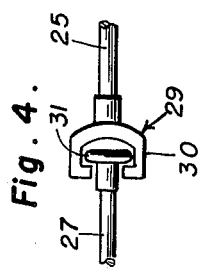
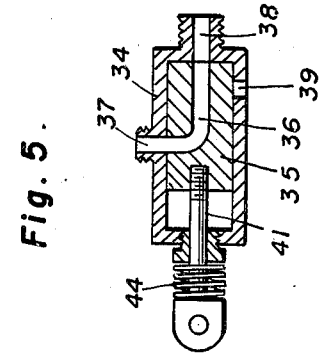
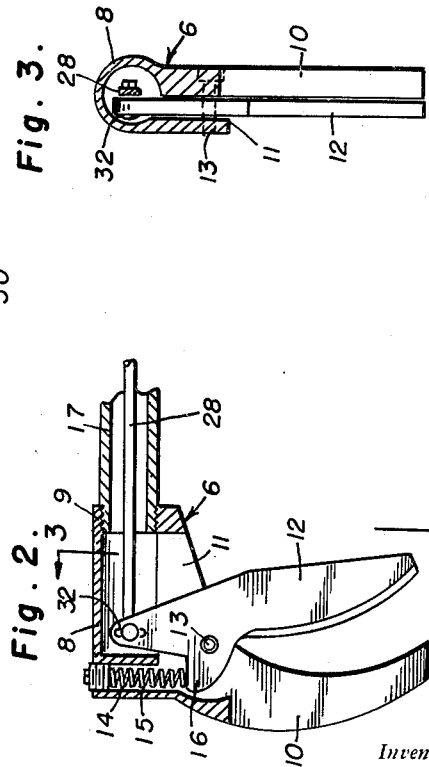
Inventor
Lawrence D. Fletcher
By Clarence A.O'Brien
and Harvey B. Jacobson
Attorneys

UNITED STATES PATENT OFFICE 2,504,405

POWER-OPERATED PRUNING SHEARS

Lawrence D. Fletcher, Lansing, Mich., assignor of one-half to William N. Calhoun, Lansing, Mich.

Application May 14, 1947, Serial No. 747,948

1 Claim. (Cl. 30—249)

This invention relates to improvements in power operated pruning shears of the type in which a pivoted blade is actuated by a fluid pressure motor to effect the pruning operation.

An object of the invention is to provide an improved pruning device of the type embodying a tubular pole, a shear assembly mounted on the upper end of the pole, a fluid pressure motor mounted on the lower end of the pole, and an actuating element connecting a blade of the shear assembly with the piston rod of said motor and extending through the tubular pole.

A further object of the invention is to provide a pruning device of the above kind in which the length of the pole and the actuating element may be readily changed to suit requirements.

A further object is to provide a pruning device of the above kind embodying a novel form of shear assembly.

Still another object of the present invention is to provide a pruning device of the above kind which is comparatively simple and durable in construction and highly efficient in operation.

The exact nature of the present invention, as well as more specific objects and features thereof, will become apparent from the following description when considered in connection with the accompanying drawings, in which:

Figure 1 is a view, partly in side elevation, and partly broken away and in longitudinal section, of a pruning device constructed in accordance with the present invention.

Figure 2 is an enlarged fragmentary section showing the shear assembly and the adjacent end of the pole.

Figure 3 is a transverse section taken on line 3—3 of Figure 2.

Figure 4 is an enlarged fragmentary view showing the connection between adjacent ends of sections of the actuating element.

Figure 5 is a longitudinal section through the control valve for the fluid pressure motor, with the movable valve member shifted from its normal position to the position in which fluid under pressure is admitted to the cylinder of said motor.

Referring in detail to the drawings, the present pruning device includes a tubular pole 5, a shear assembly 6 mounted on one end of the pole 5, and a fluid pressure motor 7 of the reciprocating type mounted on the other end of pole 5.

The shear assembly 6 includes a hollow head 8 threaded at one end on the upper end of pole 5 as at 9 and having a laterally projecting curved stationary blade 10 rigid therewith. The head 8 has a slot 11 at one side through which extends a movable blade 12 coacting with the blade 10 and arranged inwardly of or below the latter, said movable blade 12 being pivoted between its ends within the slotted side of head 8 as at 13. Head 8 is formed with a tubular chamber 14 which receives an end portion of a compression spring 15 whose other end portion bears upon a lateral lug 16 that projects upwardly from the movable blade 12 inwardly of its pivot 13. The spring 15 thus acts to normally swing the blade 12 away from the blade 10.

The pole 5 is composed of a plurality of sections 17, 18 and 19 separably joined in end to end relation by threaded coupling sleeves 20 and 21.

The motor 7 includes a cylinder 22 having a piston 23 reciprocable therein and provided at one end with a stuffing box 24 through which the rod 25 of piston 23 extends into the pole 5. Piston 23 is normally moved to a position at or adjacent the end of cylinder 22 to which pole 5 is connected by means of a helical compression spring 26 interposed between the piston 23 and the lower end of cylinder 22. Rod 25 is of a length to extend upwardly to the joint 21 when the piston 23 is in its normal upward position, and the upper end of rod 25 is operatively connected with the movable blade 12 by an actuating rod composed of sections 27 and 28. The lower end of section 25 is separably joined at 29 to the lower end of rod section 27, while the lower end of rod section 28 is similarly connected at 29' to the upper end of rod section 27, the latter connection being normally at the joint 20. Thus, by removing the pole section 18 and rod section 27, the actuating rod and the pole may be correspondingly shortened if desired, the rod section 28 being then directly connected at its lower end to the piston rod 25, and the pole section 17 being directly connected at its lower end to the rod section 19.

The separable connection between the adjacent sections of the actuating rod and between the lower section of such rod and the piston rod is preferably of the form shown in Figure 4. As clearly illustrated in this figure, a transverse slide 30 is attached to the upper end of rod 25 and rod section 27 respectively adapted for lateral detachable reception of a head 31 on the adjacent lower end of rod section 27 and rod section 28, respectively. The upper end of the upper rod section 28 is loosely pivoted at 32 to the inner end of the pivoted blade 12 so that when piston 23 is forced downwardly in cylinder 22, said blade 12 will be swung toward the stationary blade 10 to effect the shearing or pruning operation against the action of springs 15 and 26. A suitable handle 33 is fixed to the lower end of cylinder 22.

A valve is provided for controlling the admission of air under pressure to and exhaust of the same from the upper end of cylinder 22, said valve including a casing 34 having its outlet end attached to the upper end of cylinder 22 in communication with the latter. While this valve may be of any well known or preferred type, it is shown as including a reciprocating movable valve member 35 slidable in the casing 34 and having an angular passage 36 therethrough. The casing 34 has a side inlet port 37 and an outlet port 38 at its lower end, and the arrangement is such that when the movable member 35 is elevated the upper end of passage 36 is moved out of registry with inlet port 37 and the lower end of valve member 35 is elevated above a side exhaust port 39, thereby permitting fluid under pressure to be exhausted from the upper end of cylinder 22 so that the springs 15 and 26 may move the parts to the normal position of Figures 1 and 2. The arrangement is also such that when the valve member 35 is moved to its lower position as shown in Figure 5 the passage 36 connects the ports 37 and 38 so as to admit fluid under pressure to the upper end of cylinder 22 from a supply line 40 leading from any suitable source of fluid under pressure. The valve member 35 has a stem 41 slidably projecting through the upper end of casing 34 and connected by a link 42 with an angular lever 43 pivoted to the pole section 19. The lever 43 has an arm extending upwardly beside the pole section 19 and an arm extending transversely of the latter for connection with the link 42. A spring 44 surrounds the stem 41 and acts to normally elevate the valve member 35 to exhaust position. In use, the device is supported by gripping the handle 33 in one hand and the pole section 19 in the other hand adjacent the upwardly extending arm of lever 43. When the limb to be cut off has been engaged between the blades 10 and 12, the hand grasping the pole section 19 may be readily employed to press the adjacent upwardly extending arm of lever 43 toward pole section 19, thereby moving valve member 35 downwardly and admitting fluid under pressure to the upper end of cylinder 22. This causes piston 23 to move downwardly and exert a pull on the connecting rod between piston rod 25 and pivoted blade 12, thereby swinging the blade 12 toward the blade 10 and causing shearing of the limb. The lever 43 is then released so that spring 44 returns the valve member 35 to its upper position and permits exhaust of the fluid from the upper end of cylinder 22, allowing springs 15 and 26 to return the parts 12 and 23 to the normal position shown. The device or shears is then ready for the next pruning operation. In order to permit downward movement of piston 23, the lower end of cylinder 22 may be suitably vented, as by the provision of aperture 45.

From the foregoing description, it is believed that the construction, operation and advantages of the present invention will be readily understood and appreciated by those skilled in the art. It will be particularly noted that the construction is very simple, durable and compact. There are no movable parts projecting laterally beyond opposite sides of the pole at the upper end of the latter, except the movable blade 12. The operating rod is completely housed, and the structure is such as otherwise to meet with the requirements for successful commercial use. Modifications and changes in detail of construction are contemplated such as fall within the scope of the invention as claimed.

Having described the invention, what is claimed as new is:

In power operated pruning shears, a tubular pole, and a shear assembly including a hollow head secured on the upper end of said pole and having a laterally projecting stationary blade, said head further having a slot at one side, a second blade pivoted between its ends within the slotted side of the head and coacting with and arranged beneath the stationary blade, said head further having a chamber above the inner end of the second blade, said second blade having an upwardly projecting lug between its ends, and a compression spring having an end portion disposed in said chamber and an end bearing against said lug to normally swing the second blade away from the stationary blade, and a pull rod extending through the pole and pivoted at its upper end to the inner end of the second blade within the head.

LAWRENCE D. FLETCHER.

REFERENCES CITED

The following references are of record in the file of this patent:

UNITED STATES PATENTS

| Number | Name | Date |
| --- | --- | --- |
| 646,048 | Donzella | Mar. 27, 1900 |
| 728,068 | Young | May 12, 1903 |
| 1,124,991 | Bartlett | Jan. 12, 1915 |
| 2,075,341 | Goodman | Mar. 30, 1937 |
| 2,366,909 | Johnson | Jan. 9, 1945 |
| 2,423,723 | Page | July 8, 1947 |